2 Sheets--Sheet 1.

S. GRIFFIN.
Harrow, Leveler and Roller.

No. 156,022. Patented Oct. 20, 1874.

Witnesses:
A. F. Cornell.
H. C. Mann.

Inventor.
Seth Griffin.
Per. Burridge & Co.
Attorneys.

2 Sheets--Sheet 2.

S. GRIFFIN.
Harrow, Leveler and Roller.

No. 156,022. Patented Oct. 20, 1874.

Witnesses
A. T. Cornell
H. C. Mann

Inventor.
Seth Griffin,
Per. Burridge & Co.
Attys.

UNITED STATES PATENT OFFICE.

SETH GRIFFIN, OF ELYRIA, OHIO.

IMPROVEMENT IN HARROWS, LEVELERS, AND ROLLERS.

Specification forming part of Letters Patent No. 156,022, dated October 20, 1874; application filed September 7, 1874.

*To all whom it may concern:*

Be it known that I, SETH GRIFFIN, of Elyria, in the county of Lorain and State of Ohio, have invented a certain new and Improved Machine for Leveling Land, Crushing Clods, &c., of which the following is a full, clear, and complete description, reference being had to the accompanying drawings, making part of this specification, in which—

Figure 1:
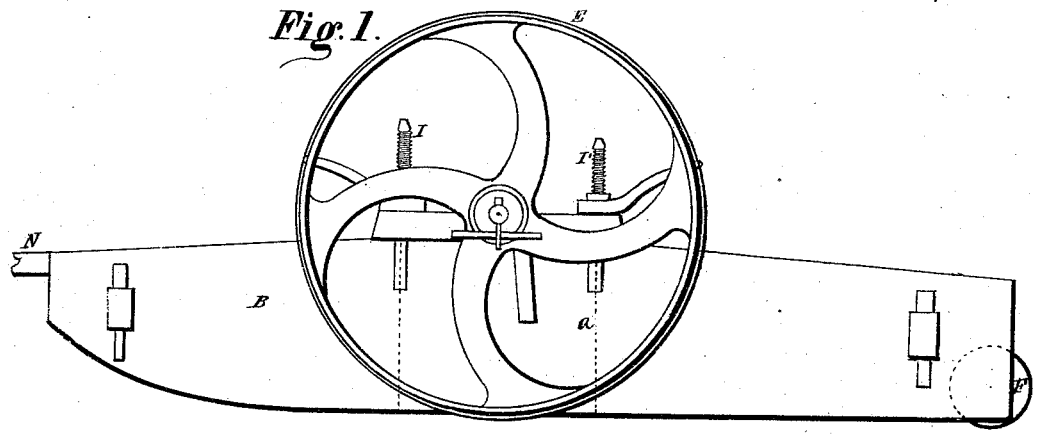
Figure 2:
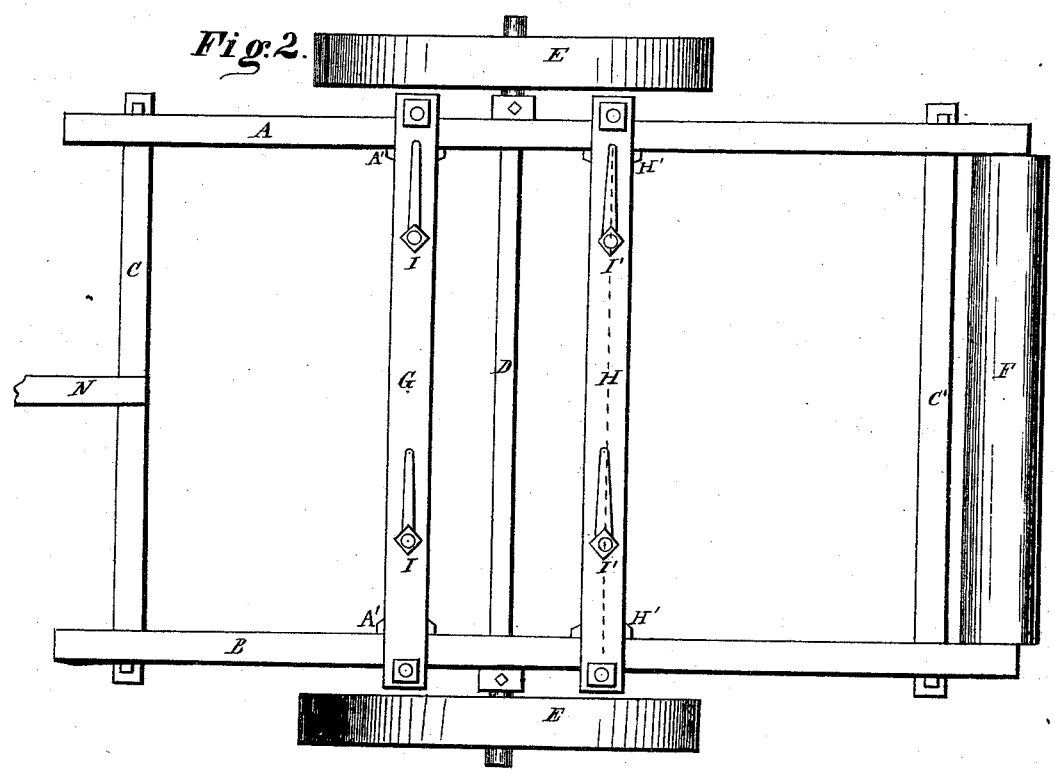
Figure 3:
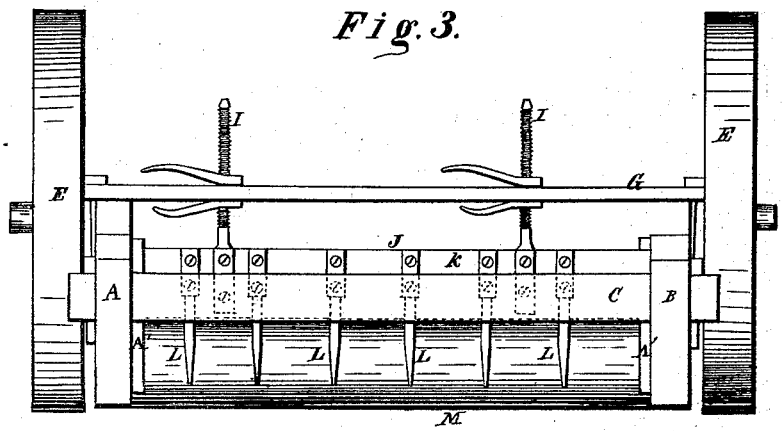

Figure 1 is a side view of the clod-crusher. Fig. 2 is a plan view. Fig. 3 is an end view.

Like letters of reference refer to like parts in the several views.

The purpose of this invention is for crushing sods, and for leveling down rough uneven ground, so that it shall be smooth and in good tilth for seeding.

The construction of the crusher and the operation of the same are as follows:

In the drawings, A B represent the sides or runners of the machine. Said sides are connected to each other by cross-ties C C', thereby forming a frame, as shown in Fig. 2. In the top of the sides A B is a shaft or axle, D, to the ends whereof are secured wheels E, whereon the frame is partially carried while the machine is in operation. F is a roller, secured to the rear end of the frame. G H are beams. To the beam G is attached, by means of adjusting-screws I, a rake or harrow, J, Fig. 3, consisting of the head K and teeth L. Each end of the head of the rake is held in guides A', Fig. 3, in which the head slides on being operated by the screws I. To the beam H is attached, in like manner, a scraper, M, the ends of which, also, are held in guides H', in which they slide by means of the adjusting-screws I'. Said scraper is indicated by the dotted lines *a*, Fig. 1; also by the dotted line in Fig. 2. Said scraper, and also the rake, by means of the adjusting-screws, can be raised or lowered, and thereby caused to vary their relation of distance in respect to the ground.

The practical operation of the above-described machine is as follows: The team, whereby it is drawn, is hitched to the front by means of the pole N. The team is now started forward in the line of work. The machine, as it follows, first rakes down the uneven ground by the rake J. The hollows that may not have been filled up, and the knolls that may not have been leveled down, by the rake are now filled and leveled down by the scraper, which follows in the wake of the rake. The lumps that may remain unbroken are crushed and rolled down by the roller F, thereby leaving the ground level and smooth for planting.

The purpose of the wheels is not so much to support and carry along the scraper, as it is to keep the frame steady in its movements, so that it shall not sway from side to side in consequence of the roughness of the ground. The weight of the machine rests mainly upon the runners or sides A B, which slide along upon the ground.

The depth that the rake enters the ground can be regulated by the adjusting-screws I'; and so, also, in regard to the scraper, it can be raised or lowered for light or heavy scraping by the screws I'.

The effect of the machine upon the condition of the ground is highly satisfactory, as it is left light by the action of the rake, level by the scraper, and pressed down by the roller.

This machine, although especially intended for field use, is well adapted for grading and leveling roads, race-courses, &c. To this particular end it is best that the scraper should be arranged diagonally in the frame, so that the scraped dirt will tend toward the middle of the road, and thereby make it higher there than at the sides.

For road use, the machine should be about half the width of the road, so that the scraping, &c., can be done in both directions, thereby causing the diagonal scraper to throw the dirt along the middle of the road and make it crowning.

What I claim as my invention, and desire to secure by Letters Patent, is—

The adjustable rake and scraper J M, and roller F, in combination with the sides or runners A B and wheels E, substantially in the manner as described, and for the purpose set forth.

SETH GRIFFIN.

Witnesses:
W. H. BURRIDGE,
A. F. CORNELL.